US012182428B2

(12) United States Patent
Blagodurov et al.

(10) Patent No.: US 12,182,428 B2
(45) Date of Patent: Dec. 31, 2024

(54) DATA PLACEMENT WITH PACKET METADATA

(71) Applicant: Advanced Micro Devices, Inc., Santa Clara, CA (US)

(72) Inventors: Sergey Blagodurov, Bellevue, WA (US); Johnathan Alsop, Bellevue, WA (US); SeyedMohammad SeyedzadehDelcheh, Bellevue, WA (US)

(73) Assignee: ADVANCED MICRO DEVICES, INC., Santa Clara, CA (US)

( * ) Notice: Subject to any disclaimer, the term of this patent is extended or adjusted under 35 U.S.C. 154(b) by 0 days.

(21) Appl. No.: 17/124,872

(22) Filed: Dec. 17, 2020

(65) Prior Publication Data
US 2022/0197506 A1 Jun. 23, 2022

(51) Int. Cl.
*G06F 3/06* (2006.01)
*G06F 12/02* (2006.01)

(52) U.S. Cl.
CPC ............ *G06F 3/064* (2013.01); *G06F 3/0604* (2013.01); *G06F 3/0685* (2013.01); *G06F 12/0246* (2013.01); *G06F 2212/251* (2013.01)

(58) Field of Classification Search
CPC .. G06F 11/30; G06F 11/3034; G06F 11/3072; G06F 2201/81; G06F 3/0604; G06F 3/0685; G06F 12/0246
USPC ......... 711/103, 105, 115, E12.001, E12.002, 711/E12.008
See application file for complete search history.

(56) References Cited

U.S. PATENT DOCUMENTS

| 6,289,506 | B1 | 9/2001 | Kwong et al. |
| 6,631,515 | B1 | 10/2003 | Berstis |
| 6,694,506 | B1 | 2/2004 | LeBlanc et al. |
| 6,789,253 | B1 | 9/2004 | Streich et al. |

(Continued)

OTHER PUBLICATIONS

Cifuentes, Cristina, "A Structuring Algorithm for Decompilation", Proceedings of the XIX Conferencia Latinoamericana de Informatica, Aug. 1993, Buenos Aires, pp. 267-276.

(Continued)

*Primary Examiner* — Gautam Sain
*Assistant Examiner* — Edward Waddy, Jr.
(74) *Attorney, Agent, or Firm* — Kowert, Hood, Munyon, Rankin & Goetzel, P.C.; Rory D. Rankin

(57) ABSTRACT

Systems, apparatuses, and methods for determining data placement based on packet metadata are disclosed. A system includes a traffic analyzer that determines data placement across connected devices based on observed values of the metadata fields in actively exchanged packets across a plurality of protocol types. In one implementation, the protocol that is supported by the system is the compute express link (CXL) protocol. The traffic analyzer performs various actions in response to events observed in a packet stream that match items from a pre-configured list. Data movement is handled underneath the software applications by changing the virtual-to-physical address translation once the data movement is completed. After the data movement is finished, threads will pull in the new host physical address into their translation lookaside buffers (TLBs) via a page table walker or via an address translation service (ATS) request.

20 Claims, 6 Drawing Sheets

(56) References Cited

U.S. PATENT DOCUMENTS

| | | | |
|---|---|---|---|
| 7,849,452 | B2 | 12/2010 | Holt |
| 9,794,605 | B2* | 10/2017 | Lindahl ............ H04N 21/43072 |
| 10,185,678 | B1* | 1/2019 | Stoler ................. G06F 13/4282 |
| 2003/0177320 | A1 | 9/2003 | Sah et al. |
| 2003/0204838 | A1 | 10/2003 | Caspole et al. |
| 2004/0139424 | A1 | 7/2004 | Mourachov |
| 2004/0228274 | A1* | 11/2004 | Yazaki ................. H04L 12/5602 370/395.21 |
| 2005/0114536 | A1* | 5/2005 | Narad ................. H04L 43/0888 709/231 |
| 2005/0188364 | A1 | 8/2005 | Cockx et al. |
| 2007/0226698 | A1 | 9/2007 | Cascaval et al. |
| 2007/0234276 | A1 | 10/2007 | Ottoni et al. |
| 2008/0022264 | A1 | 1/2008 | Macklem et al. |
| 2008/0263075 | A1 | 10/2008 | Talja |
| 2009/0044179 | A1 | 2/2009 | Luszczek et al. |
| 2009/0132867 | A1 | 5/2009 | Stefansson et al. |
| 2009/0300636 | A1 | 12/2009 | Ringseth et al. |
| 2010/0082930 | A1 | 4/2010 | Jiva et al. |
| 2010/0115502 | A1 | 5/2010 | Jiva et al. |
| 2010/0122242 | A1 | 5/2010 | Jiva |
| 2010/0199268 | A1 | 8/2010 | Frost |
| 2010/0306514 | A1 | 12/2010 | Frost |
| 2011/0004866 | A1 | 1/2011 | Frost |
| 2011/0067013 | A1 | 3/2011 | Frost et al. |
| 2011/0157992 | A1* | 6/2011 | Strasser ................. G06F 12/12 365/185.18 |
| 2011/0289519 | A1 | 11/2011 | Frost |
| 2014/0143274 | A1* | 5/2014 | Ishikawa ................. G06F 16/27 707/770 |
| 2016/0378674 | A1* | 12/2016 | Cheng ................. G06F 12/1072 711/206 |
| 2017/0220499 | A1* | 8/2017 | Gray ....................... G06F 13/36 |
| 2017/0304727 | A1* | 10/2017 | Gallizzi ................. A63F 13/493 |
| 2018/0032444 | A1* | 2/2018 | Voigt ................. G06F 12/1027 |
| 2018/0307833 | A1* | 10/2018 | Noeth ................... G06F 21/554 |
| 2018/0359141 | A1* | 12/2018 | Valverde Garro .. H04L 41/0686 |
| 2019/0102311 | A1* | 4/2019 | Gupta ................. G06F 12/0897 |
| 2019/0155645 | A1* | 5/2019 | Browne ................ G06F 9/4881 |
| 2019/0166062 | A1* | 5/2019 | Verbree ................... H04L 65/80 |
| 2019/0227877 | A1* | 7/2019 | Pandey ................. G06F 16/128 |
| 2020/0105354 | A1* | 4/2020 | Helmick ............ G11C 16/3495 |
| 2020/0242080 | A1* | 7/2020 | Dain ....................... G06F 16/38 |
| 2021/0034584 | A1* | 2/2021 | Dalmatov ............. G06F 16/215 |
| 2021/0042831 | A1* | 2/2021 | Parsons .................. G06Q 40/04 |
| 2021/0064263 | A1* | 3/2021 | Shin ....................... G06F 3/0647 |
| 2021/0136150 | A1* | 5/2021 | Zhang ..................... H04L 67/06 |

OTHER PUBLICATIONS

Meadows, Rob, "Decompilation of Binary Programs by Cristina Cifuentes and John Gough", 6 pages, https://www2.cs.arizona.edu/~collberg/Teaching/620/1999/Handouts/rmeadows1.pdf. [Retrieved Feb. 28, 2022].

International Search Report and Written Opinion in International Application No. PCT/US2011/037029, mailed Aug. 23, 2011, 12 pages.

Calvert, Peter, "Parallelisation of Java for Graphics Processors", Computer Science Tripos, Part II, Trinity College, XP002651463, May 11, 2010, pp. 1-91.

Bik et al., "javab—a prototype bytecode parallelization tool", Technical Report TR489, Computer Science Department, Indiana University, XP002651464, Jul. 1997, 46 pages.

Dotzler et al., "JCudaMP: OpenMP/Java on CUDA", Proceedings of the 3rd International Workshop on Multicore Software Engineering, XP55003114, Jan. 1, 2010, pp. 10-17.

Yan, et al., "JCUDA: A Programmer-Friendly Interface for Accelerating Java Programs with CUDA", Euro-Par 2009 Parallel Processing, XP019127296, Aug. 25, 2009, pp. 887-899.

Communication pursuant to Article 94(3) EPC in European Application No. 11722689.4 mailed Apr. 24, 2014, 5 pages.

Wirth, "Algorithms and Data Structures", ETH Zurich, Oberon Version, Aug. 2004, pp. 5-44.

Leung et al., "Automatic Parallelization for Graphics Processing Units", In Proceedings of the 7th International Conference on Principles and Practice of Programming in Java (PPPJ 09), Aug. 28, 2009, pp. 91-100, ACM, New York, NY, USA.

Keeton et al., "Persistent Memory: New Tier or Storage Replacement?", SNIA Storage Develop Conference, Presentation, Hewlett Packard Enterprise, Sep. 13, 2017, 43 pages, https://www.snia.org/sites/default/files/SDC/2017/presentations/General_Session/Keeton_Kimberly_Spence_Susan_Persistent_Memory_New_Tier_or_Storage_Replacement.pdf. [Retrieved Feb. 28, 2022].

International Search Report and Written Opinion in International Application No. PCT/US2021/063741, mailed Apr. 14, 2022, 10 pages.

* cited by examiner

| Entry | Description of Event | Priority |
|---|---|---|
| 505 | I/O Device ATS Translation Completion | Medium |
| 510 | Bias Flip Request | High |
| 515 | "N" Read For Ownership Packets | High |
| 520 | "N" Memory Write Packets | High |
| 525 | "N" Clean Evict Packets | Medium |
| 530 | "N" Dirty Evict Packets | High |
| 535 | "N" Snoop Data Packets | Medium |
| 540 | "N" Snoop Invalidate Packets | Medium |
| 545 | Memory Read (Exclusive) Packet | High |
| 550 | Memory Read (Non-Cacheable) Packet | Medium |

FIG. 5

DATA PLACEMENT WITH PACKET METADATA

BACKGROUND

Description of the Related Art

Computer industry solutions for interconnects are becoming increasingly heterogeneous in both protocol support and underlying technology. For example, compute express link (CXL), Gen-Z, and Slingshot have emerged as high performance, low latency, memory-centric fabrics that can be used to communicate to every device in the system. Memory intensive applications, such as high performance computing (HPC) and deep learning (DL) applications, often run on these types of systems. Determining strategies for data placement across connected devices to reduce latency and energy consumption for data accesses by various software applications executing on systems employing these new types of interconnects can be challenging.

BRIEF DESCRIPTION OF THE DRAWINGS

The advantages of the methods and mechanisms described herein may be better understood by referring to the following description in conjunction with the accompanying drawings, in which:

FIG. 5 illustrates one example of an event list.

DETAILED DESCRIPTION OF IMPLEMENTATIONS

In the following description, numerous specific details are set forth to provide a thorough understanding of the methods and mechanisms presented herein. However, one having ordinary skill in the art should recognize that the various implementations may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

Various systems, apparatuses, and methods for determining data placement based on packet metadata are disclosed herein. In one implementation, a system includes a traffic analyzer that determines data placement across connected devices based on observed values of the metadata fields in actively exchanged packets across a plurality of protocol types. In one implementation, the protocol that is supported by the system is the compute express link (CXL) protocol. In another implementation, the system supports the Gen-Z protocol. In a further implementation, the system supports the Slingshot interconnect protocol. In other implementations, other types of interconnect protocols can be supported by the system. In one implementation, the traffic analyzer has an associated direct memory access (DMA) engine for moving data across the devices connected within the system. In some cases, the system includes multiple traffic analyzers located at various locations throughout the interconnect fabric of the system.

In one implementation, the traffic analyzer performs various actions in response to events observed in a packet stream that match items from a pre-configured list. In some cases, the pre-configured list is programmable such that the list can be updated by software. In one implementation, addresses sent on the interconnect fabric are host physical addresses (HPA's). In this implementation, the data movement is handled underneath the software applications by changing the virtual-to-physical translation once the data movement is completed. After the data movement is finished, the threads will pull in the new HPA into their translation lookaside buffers (TLBs) via a page table walker or via an address translation service (ATS) request. The traffic analyzer maintains a list of accessible media devices to which data can be relocated. In one implementation, the list of accessible media devices is updated in response to discovery events being performed.

Figure 1:
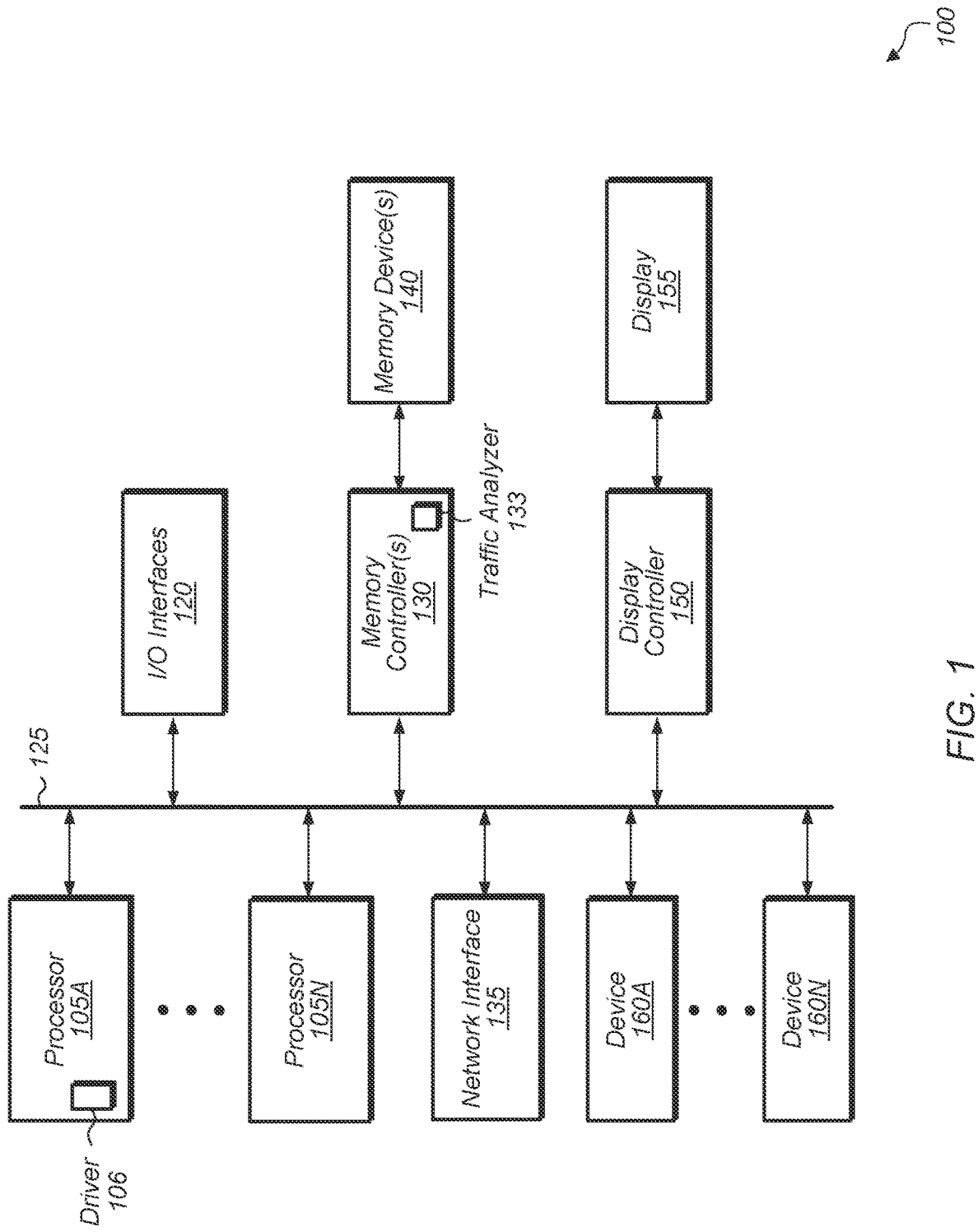
FIG. 1 is a block diagram of one implementation of a computing system.

Referring now to FIG. 1, a block diagram of one implementation of a computing system 100 is shown. In one implementation, computing system 100 includes at least processors 105A-N, input/output (I/O) interfaces 120, bus 125, memory controller(s) 130, network interface 135, memory device(s) 140, display controller 150, display 155, and devices 160A-N. In other implementations, computing system 100 includes other components and/or computing system 100 is arranged differently. The components of system 100 are connected together via bus 125 which is representative of any number and type of interconnects, links, fabric units, buses, and other connectivity modules.

Processors 105A-N are representative of any number of processors which are included in system 100. In one implementation, processor 105A is a general-purpose processor, such as a central processing unit (CPU). In this implementation, processor 105A executes a driver 106 (e.g., graphics driver) for controlling the operation of one or more of the other processors in system 100. It is noted that depending on the implementation, driver 106 can be implemented using any suitable combination of hardware, software, and/or firmware.

In one implementation, processor 105N is a data parallel processor with a highly parallel architecture. Data parallel processors include graphics processing units (GPUs), digital signal processors (DSPs), field programmable gate arrays (FPGAs), application specific integrated circuits (ASICs), and so forth. In some implementations, processors 105A-N include multiple data parallel processors. In one implementation, processor 105N is a GPU which provides pixels to display controller 150 to be driven to display 155. In one implementation, devices 160A-N include any number and type of accelerator devices, I/O devices, and other devices. In one implementation, each device 160A-N has its own memory which is specific to the device 160A-N. In some cases, one or more of devices 160A-N can be a processor such as a GPU.

Memory controller(s) 130 are representative of any number and type of memory controllers accessible by processors 105A-N and/or devices 160A-N. While memory controller(s) 130 are shown as being separate from processor 105A-N and device 160A-N, it should be understood that this merely represents one possible implementation. In other implementations, a memory controller 130 can be embedded within one or more of processors 105A-N and/or a memory controller 130 can be located on the same semiconductor die as one or more of processors 105A-N. Also, in one implementation, a memory controller 130 can be embedded within or located on the same die as one or more of devices 160A-N to access memory device(s) 140 that are local to devices 160A-N.

In one implementation, each memory controller 130 includes a traffic analyzer 133. In other implementations, traffic analyzer 133 can be located elsewhere in system 100 in locations suitable for snooping traffic traversing bus 125. It is noted that traffic analyzer 133 can also be referred to as controller 133. In one implementation, traffic analyzer 133 performs various actions in response to events observed in a packet stream that match items from a pre-configured list. In some cases, the pre-configured list is programmable such that the list can be updated by software. In one implementation, addresses sent on the bus 125 are host physical addresses (HPA's). In this implementation, the data movements are handled underneath of applications by changing the virtual-to-physical translation once the data movements are completed. After the data movement is finished, the threads executing on processors 105A-N or devices 160A-N will pull in the new HPA into their translation lookaside buffers (TLBs) via a page table walker or via an address translation service (ATS) request.

Memory controller(s) 130 are coupled to any number and type of memory devices(s) 140. For example, the type of memory in memory device(s) 140 includes high-bandwidth memory (HBM), non-volatile memory (NVM), Dynamic Random Access Memory (DRAM), Static Random Access Memory (SRAM), NAND flash memory, NOR flash memory, Ferroelectric Random Access Memory (FeRAM), or others.

I/O interfaces 120 are representative of any number and type of I/O interfaces (e.g., peripheral component interconnect (PCI) bus, PCI-Extended (PCI-X), PCIE (PCI Express) bus, gigabit Ethernet (GBE) bus, universal serial bus (USB)). Various types of peripheral devices (not shown) are coupled to I/O interfaces 120. Such peripheral devices include (but are not limited to) displays, keyboards, mice, printers, scanners, joysticks or other types of game controllers, media recording devices, external storage devices, network interface cards, and so forth. Network interface 135 is used to receive and send network messages across a network (not shown).

In various implementations, computing system 100 is a computer, laptop, mobile device, game console, server, streaming device, wearable device, or any of various other types of computing systems or devices. It is noted that the number of components of computing system 100 varies from implementation to implementation. For example, in other implementations, there are more or fewer of each component than the number shown in FIG. 1. It is also noted that in other implementations, computing system 100 includes other components not shown in FIG. 1. Additionally, in other implementations, computing system 100 is structured in other ways than shown in FIG. 1.

Figure 2:
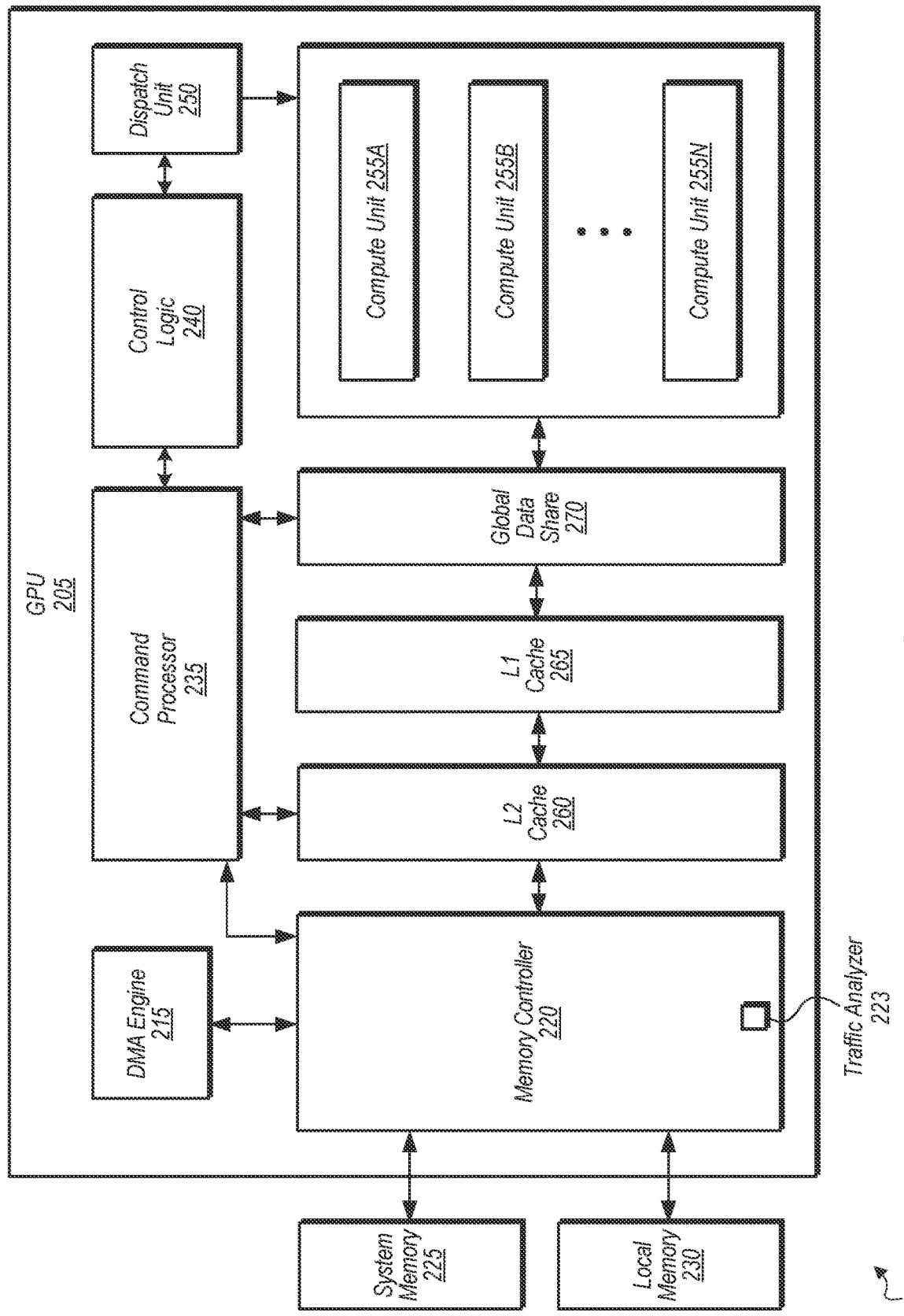
FIG. 2 is a block diagram of another implementation of a computing system.

Turning now to FIG. 2, a block diagram of another implementation of a computing system 200 is shown. In one implementation, system 200 includes GPU 205, system memory 225, and local memory 230. System 200 can also include other components which are not shown to avoid obscuring the figure. GPU 205 includes at least command processor 235, control logic 240, dispatch unit 250, compute units 255A-N, DMA engine 215, memory controller 220, global data share 270, level one (L1) cache 265, and level two (L2) cache 260. In one implementation, memory controller 220 includes traffic analyzer 223 for monitoring packets that traverse system 200. In other implementations, GPU 205 includes other components, omits one or more of the illustrated components, has multiple instances of a component even if only one instance is shown in FIG. 2, and/or is organized in other suitable manners. In one implementation, the circuitry of GPU 205 is included in processor 105N (of FIG. 1).

In various implementations, computing system 200 executes any of various types of software applications. As part of executing a given software application, a host CPU (not shown) of computing system 200 launches work to be performed on GPU 205. In one implementation, command processor 235 receives kernels from the host CPU and uses dispatch unit 250 to issue corresponding wavefronts to compute units 255A-N. Wavefronts executing on compute units 255A-N read and write data to global data share 270, L1 cache 265, and L2 cache 260 within GPU 205. Although not shown in FIG. 2, in one implementation, compute units 255A-N also include one or more caches and/or local memories within each compute unit 255A-N.

In one implementation, each compute unit 255A-N is a Single Instruction Multiple Data (SIMD) processing core. As referred to herein, a "compute unit" is a pipeline, or programming model, where respective instantiations of the same kernel are executed concurrently. Each processing element in a compute unit executes a respective instantiation of the same kernel. An instantiation of a kernel, along with its associated data, is called a work-item or thread. Thus, a kernel is the code for a work-item, and a work-item is the basic unit of work on a compute unit. All instantiations of a kernel executing on compute units 255A-N comprise a global domain of work-items. This global domain of work-items can represent the entire computation domain, and a work-item within the computation domain represents a particular task to be performed. In order to simplify execution of work-items on GPU 205, work-items are grouped together into wavefronts. A wavefront is a collection of related work-items that execute together on a single compute unit.

In parallel with command processor 235 launching wavefronts on compute units 255A-N, DMA engine 215 performs various DMA operations in collaboration with traffic analyzer 223. It is noted that DMA engine 215 is representative of any number and type of DMA engines. In one implementation, traffic analyzer 223 programs DMA engine 215 to move data between devices in response to events observed in a packet stream that match items from a pre-configured list.

Figure 3:
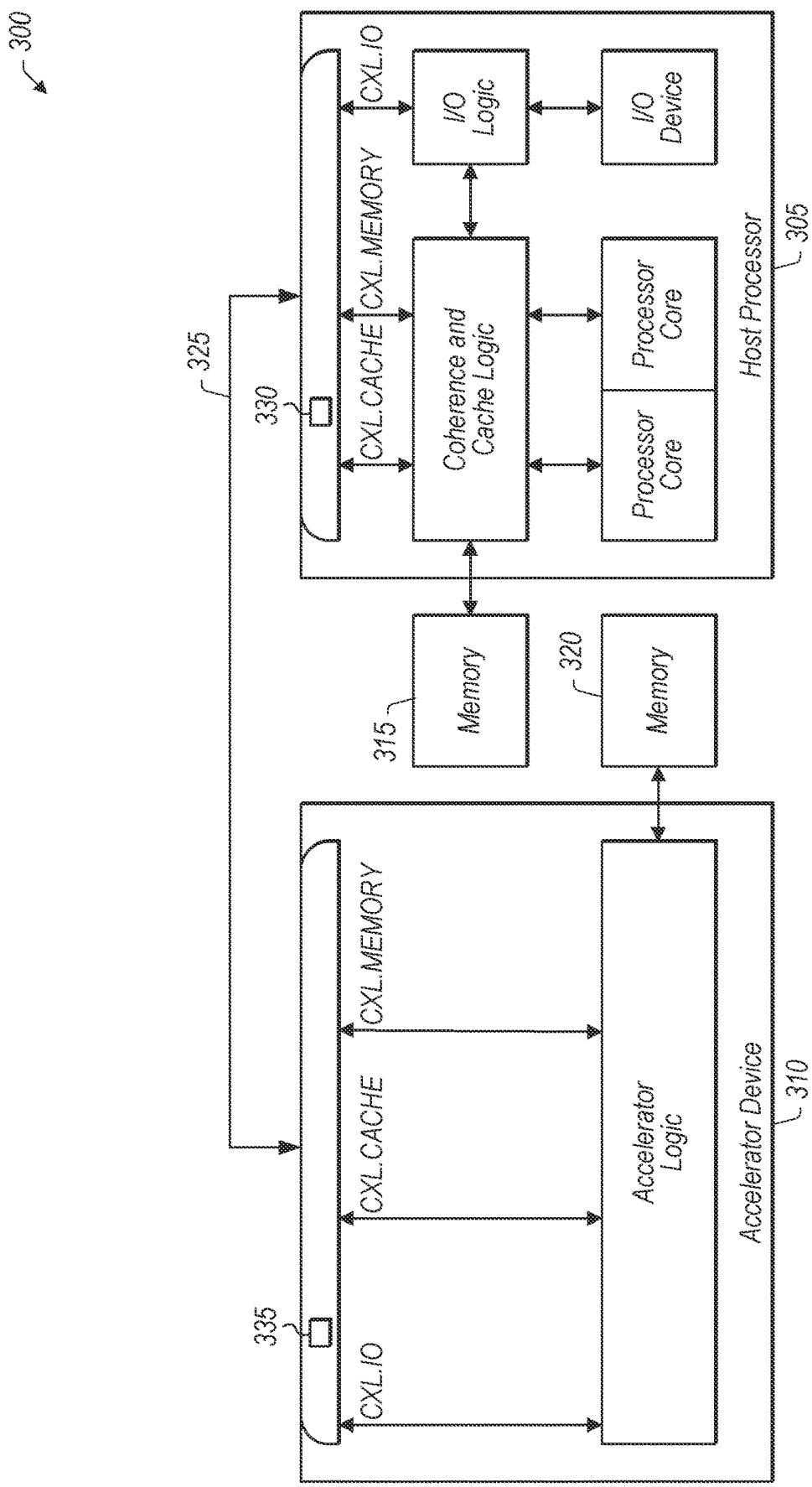
FIG. 3 is a block diagram of one implementation of a computing system employing a CXL protocol.

Referring now to FIG. 3, a block diagram of one implementation of a computing system 300 employing a CXL protocol is shown. In one implementation, computing system 300 includes host processor 305 and accelerator device 310 connected via link 325. In one implementation, host processor 305 and accelerator device 310 operate in the same virtual address space. In other words, in this implementation, host processor 305 and accelerator device 310 have a unified address space. For any other processing devices, accelerators, or other devices in system 300, although not shown in FIG. 3, these other devices can also operate in the same virtual address space as host processor 305 and accelerator device 310. In one implementation, system 300 utilizes this shared address space in compliance with the heterogeneous system architecture (HSA) industry standard.

In the example illustrated in FIG. 3, host processor 305 includes one or more processor cores and one or more I/O devices. Host processor 305 also includes coherence and cache logic as well as I/O logic. In one implementation, host processor 305 is a CPU, while in other implementations, host processor 305 is any of various other types of processing units. System memory 315 can be included on the same package or die as host processor 305. It is noted that one or more other devices can also be connected to link 325 although this is not shown in FIG. 3 to avoid obscuring the figure.

In one implementation, communication between host processor 305 and accelerator device 310 over link 325 can be performed according to the CXL protocol. CXL technology enables memory coherency between the memory space of host processor 305 and the memory of accelerator device 310, allowing for higher performance and reduced complexity for applications executing on system 300. The CXL traffic has three different types of traffic classes which are cache, memory, and I/O traffic classes. These traffic classes (i.e., protocol types) are multiplexed together over link 325 and then split out into the individual classes internally within host processor 305 and accelerator device 310. While system 300 is shown and described as employing the CXL protocol, it should be understood that this is merely indicative of one particular implementation. Other types of systems employing other types of coherent interconnect protocols can also take advantage of the techniques presented herein.

In one implementation, host processor 305 includes a traffic analyzer 330 and accelerator device 310 includes a traffic analyzer 335. Traffic analyzers 330 and 335 monitor the packets that are sent over link 325. Traffic analyzers 330 and 335 analyze the metadata associated with the packets to determine how to move data between system memory 315 and device-attached memory 320. In one implementation, each traffic analyzer 330 and 335 includes a list of events which determine when the movement of data is triggered. If the metadata in a given packet meets the criteria in one of the entries of the list of events, then the traffic analyzer causes data to be moved to the memory which is closest to the device which is more likely to use the data in the near future. While two traffic analyzers 330 and 335 are shown in FIG. 3, it should be understood that other implementations can have other numbers of traffic analyzers (e.g., 1, 3, 16).

Figure 4:
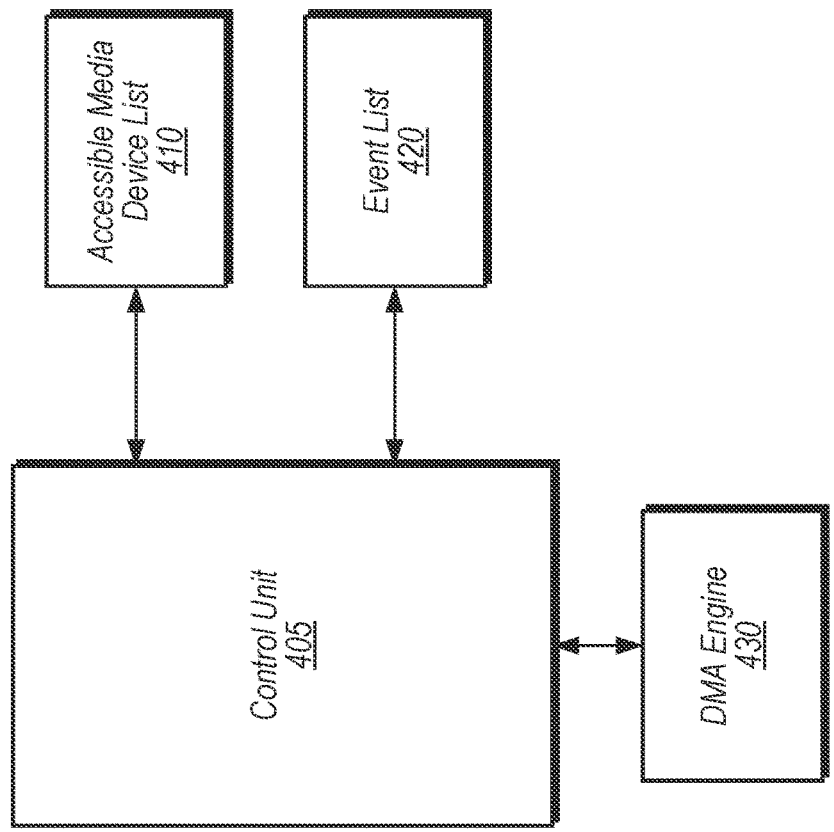
FIG. 4 is a block diagram of one implementation of a controller.

Turning now to FIG. 4, a block diagram of one implementation of a controller 400 is shown. It is noted that controller 400 can also be referred to as traffic analyzer 400. In one implementation, traffic analyzer 133 (of FIG. 1), traffic analyzer 223 (of FIG. 2), and traffic analyzers 330 and 335 (of FIG. 3) include the components and functionality of controller 400. Control unit 405 is connected to DMA engine 430 and uses DMA engine 430 to move data across the devices that are included within the overall system (e.g., system 100 of FIG. 1). Control unit 405 can be implemented using any combination of circuitry, execution units, processor cores, memory elements, and/or program instructions.

Controller 400 maintains and/or accesses accessible media device list 410 and event list 420 during operation. Accessible media device list 410 includes identifications of media device(s) that are accessible by controller 400. Accessible media device list 410 is updated upon discovery events, vendor defined messages (VDMs), and based on other operations. Event list 420 includes a listing of events that trigger data movement. In one implementation, the lowest priority events are listed first in event list 420. In another implementation, each event has an associated priority indicator which is stored with the event. If two events are observed simultaneously and trigger conflicting actions, then the higher priority event is satisfied first.

For example, if a first event commands a prefetcher on a given core or device to be enabled and a second event causes the prefetcher on the given core or device to be disabled, then the higher priority event will be performed first. Also, if a first event requests that a given data region be moved to a first location, and a second event requests to move the given data region to a second location, then the higher priority event will satisfied first. Still further, if two different events request a DMA engine, but the requests cannot be satisfied at the same time by the DMA engine, then the higher priority event will be performed first. In one implementation, after an event triggers a movement for a given data region, there is a period of time (i.e., a cool down period) during which no other event can trigger another movement of the given data region.

Referring now to FIG. 5, one example of an event list 500 is shown. In one implementation event list 420 (of FIG. 4) includes the entries of event list 500. Event 505 refers to an I/O address translation service (ATS) translation completion event. In one implementation, an ATS translation completion restricts access to a CXL.IO protocol type by setting the "CXL" bit in the translation completion date entry. In one implementation, the "CXL" bit is set for an uncacheable type of data. When such an event occurs, the controller places the corresponding page on a media that is suited for I/O style, block accesses. This is due to the fact that cache line granularity CXL.cache and CXL.mem accesses will likely not happen to the page in the near future. In one implementation, a media that is suited for I/O style, block accesses is a flash device. As used herein, the term "flash" device refers to an electronic non-volatile computer memory storage medium that can be written to or erased with electricity. There are two main types of flash memory, which are NOR flash and NAND flash. In one implementation, entry 505 has a medium priority.

Entry 510 refers to a bias flip request event. Bias flip requests are sent from the device to the host to invalidate a cache line from the host's caches. In one implementation, bias flip requests are sent on the CXL.cache request channel using the RdOwnNoData opcode. A bias flip request is a strong indication that the memory will be used by the device in the near future. As a consequence, the controller will pull the memory region associated with the bias flip request to the device's local memory. In one implementation, bias flip requests have a high priority.

Entry 515 refers to an event when "N" read for ownership packets to cache lines of the same page are detected, where "N" is a positive integer. In one implementation, the size of a cache line is 64 bytes and the size of a page is 4 kilobytes (KB). However, the sizes of cache lines and pages can vary in other implementations. Also, the value of "N" can vary from implementation to implementation, with "N" serving as a threshold for triggering data movement. A read for ownership packet refers to an operation where a device is caching data in any writeable state (e.g., modified state, exclusive state). The action performed by the controller in response to detecting this event is to pull the data to the local device memory due to the likelihood of subsequent memory accesses to the same data range. In one implementation, entry 515 has a high priority.

Entry 520 refers to an atomic write of a full cache line. When "N" of these packets to the same page are detected, the data will be pulled to the local device memory. If the request misses in the last level cache, the data will be written to memory. In one implementation, entry 520 has a high priority.

Entry 525 refers to a clean eviction of a cache line. In one implementation, entry 525 occurs when the host generates a request to evict data from a device cache. Entry 525 can refer to a clean evict request with data or a clean evict without data. In other words, the host either asks for the clean data or not. The action performed in response to detecting "N" of these requests to the same page is to pull the data to the main memory of the host. In one implementation, entry 525 has a medium priority.

Entry 530 refers to an eviction of modified data from a device cache which is requested by the host. If "N" of these dirty evict packets are detected to the same page, then the action performed is to transfer the corresponding modified data to the host main memory.

In one implementation, entry 530 has a high priority.

Entry 535 refers to a snoop request when the host will cache the data in a shared or exclusive state. The device will degrade the cache line to shared or invalid and return dirty data. If "N" of these snoop request packets are detected to the same page, then the action performed is to transfer the page to the host main memory. In one implementation, entry 535 has a medium priority.

Entry 540 refers to a snoop invalidate request when the host will cache the data in an exclusive state. The device will invalidate the cache line in response to receiving the snoop invalidate request. If "N" of these snoop invalidate request packets are detected to the same page, then the action performed is to transfer the page to the host main memory. In one implementation, entry 540 has a medium priority.

Entry 545 refers to a memory read packet when the host wants an exclusive copy of the cache line. When this event is detected, the action taken is to pull the corresponding data to the host main memory for subsequent accesses. In one implementation, entry 545 has a high priority.

Entry 550 refers to a memory read packet when the host wants a non-cacheable but current copy of the cache line. When this event is detected, the action taken is to pull the corresponding data to the host main memory for subsequent accesses. In one implementation, entry 550 has a medium priority.

It should be understood that the example of entries 505-550 shown in event list 500 are merely indicative of one particular implementation. In other implementations, event list 500 can have other numbers and/or types of entries corresponding to other types of events which will trigger data movement. It is also noted that the value of "N" can vary from entry to entry, with one entry having a higher value of "N" and another entry having a lower value of "N". For example, one entry can cause a movement of a page when 5 packets targeting the page are detected while another entry can cause a movement of a page when 3 packets associated with cache lines of the page are detected. In other words, the threshold for data movement depends on the event type, with different events having different thresholds.

While the priorities of entries 505-550 are shown as taking on values of High, Medium, and Low, this is merely representative of one implementation. These values can be converted into numeric or binary values in other implementations. The number of bits that are used to encode the priority values can vary according to the implementation. Also, while a single list 500 is shown in FIG. 5, it should be understood that list 500 is representative of any number of lists that can be maintained and accessed by a traffic analyzer. For example, in another implementation, the traffic analyzer maintains three lists, one for the CXL.memory protocol type, one for the CXL.cache protocol type, and one for the CXL.io protocol type. Depending on the type of packet that is detected, the traffic analyzer will query the list corresponding to the packet's protocol type.

Figure 6:
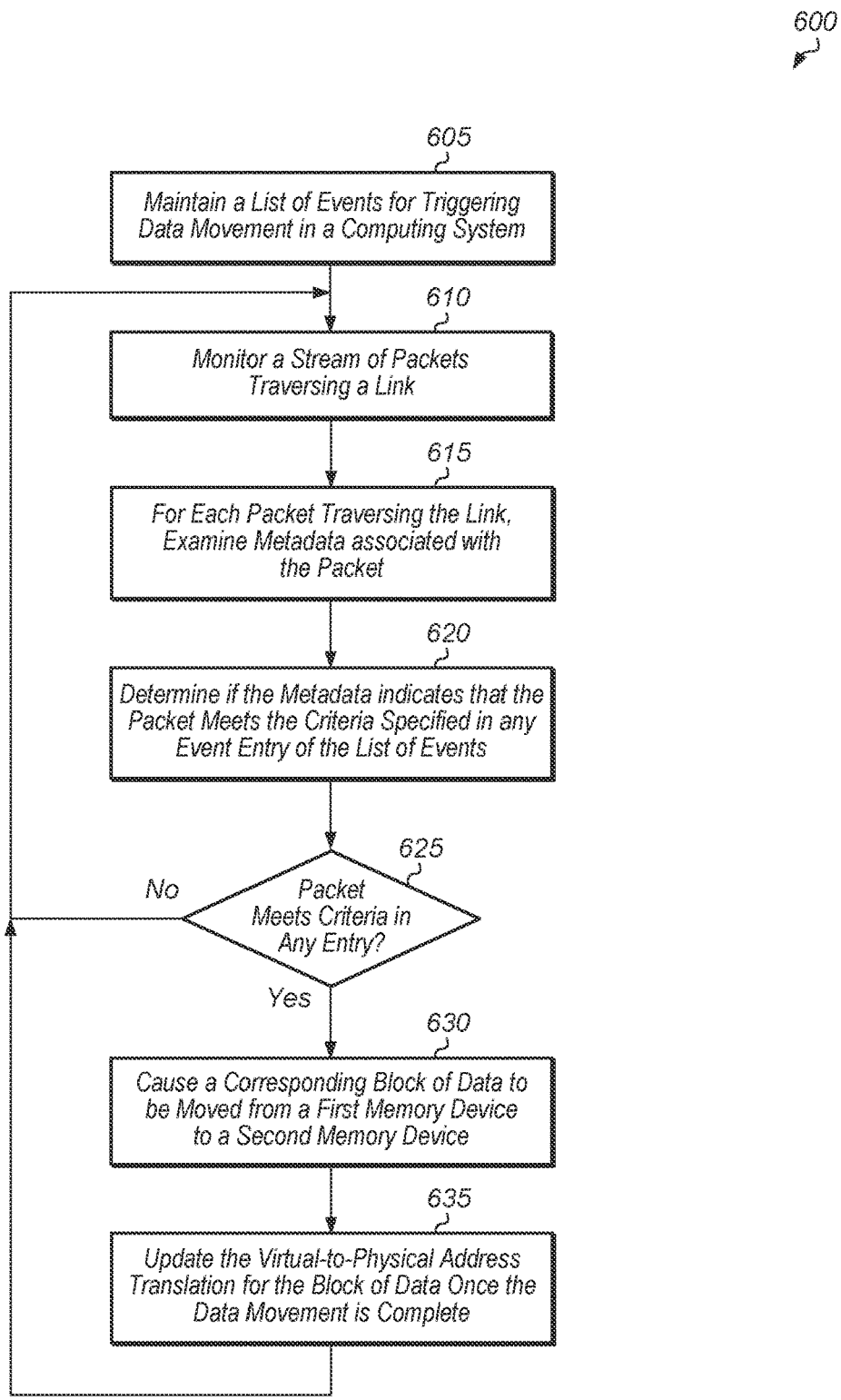
FIG. 6 is a generalized flow diagram illustrating one implementation of a method for determining data placement based on packet metadata.

Turning now to FIG. 6, one implementation of a method 600 for determining data placement based on packet metadata is shown. For purposes of discussion, the steps in this implementation are shown in sequential order. However, it is noted that in various implementations of the described methods, one or more of the elements described are performed concurrently, in a different order than shown, or are omitted entirely. Other additional elements are also performed as desired. Any of the various systems or apparatuses described herein are configured to implement method 600.

A traffic analyzer maintains a list of events for triggering data movement in a computing system (block 605). Also, the traffic analyzer monitors a stream of packets traversing a link (block 610). The link can be an interconnect, a fabric, a bus, a memory channel, or otherwise. For each packet traversing the link, the traffic analyzer examines metadata associated with the packet (block 615). In another implementation, the traffic analyzer analyzes a portion (i.e., subset) of the packets traversing the link. For example, in one implementation, the traffic analyzer examines one of every four packets traversing the link. Other ratios (e.g., ⅛, 1/16) are possible in other implementations. The traffic analyzer determines if the metadata indicates that the packet meets the criteria specified in any event entry of the list of events (block 620).

If metadata indicates that a given packet meets the criteria specified in any event entry of the list of events (conditional block 625, "yes" leg), then the traffic analyzer causes a corresponding block of data to be moved from a first memory device to a second memory device (block 630). It is assumed for the purposes of this discussion that the second memory device is different from the first memory device. In one implementation, the traffic analyzer queries an accessible media device list (e.g., accessible media device list 410 of FIG. 4) to determine a preferred memory device for migrating the corresponding block of data. In one implementation, the traffic analyzer is coupled to a DMA engine, and the traffic analyzer programs the DMA engine to perform the data movement from the first memory device to the second memory device.

Also, the virtual-to-physical address translation is updated for the block of data once the data movement is complete (block 635). Updating the translation can involve any number of actions being performed in a particular order, such as notifying the operating system (OS), pausing an application, initiating a TLB shootdown, and so on. Depending on the implementation and the system architecture, the traffic analyzer can be programmed to perform these and/or other steps in an order specific to the system architecture. In some cases, the traffic analyzer performs steps to update the translation in the page table and TLBs without invoking the OS. In other cases, the traffic analyzer cooperates with the OS so as to update the translation. For example, in one implementation, the traffic analyzer sends a packet over the link to the OS requesting the translation update. After block 635, method 600 returns to block 610 with the traffic analyzer continuing to monitor the stream of packets traversing the link.

Otherwise, if the metadata of the given packet does not meet the criteria specified in any event entry of the list of events (conditional block 625, "no" leg), then method 600 returns to block 610 with the traffic analyzer continuing to monitor the stream of packets traversing the link.

In various implementations, program instructions of a software application are used to implement the methods and/or mechanisms described herein. For example, program instructions executable by a general or special purpose processor are contemplated. In various implementations, such program instructions are represented by a high level programming language. In other implementations, the program instructions are compiled from a high level programming language to a binary, intermediate, or other form. Alternatively, program instructions are written that describe the behavior or design of hardware. Such program instructions are represented by a high-level programming language, such as C. Alternatively, a hardware design language (HDL) such as Verilog is used. In various implementations, the program instructions are stored on any of a variety of non-transitory computer readable storage mediums. The storage medium is accessible by a computing system during use to provide the program instructions to the computing system for program execution. Generally speaking, such a computing system includes at least one or more memories and one or more processors configured to execute program instructions.

It should be emphasized that the above-described implementations are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. An apparatus comprising:
    control circuitry configured to:
        maintain, in a memory, a programmable list of events comprising a plurality of entries, where each of the entries is configured to store:
            an identification of criteria that indicate an occurrence of an event; and
            a priority;
        monitor a stream of packets traversing a link, each of the packets comprising a memory access request; and
        responsive to the stream of packets meeting criteria associated with an event identified by an entry of the plurality of entries, program a direct memory access (DMA) device to cause data corresponding to a data region targeted by a memory request of the stream of packets to be moved from a first memory device to a second memory device different from the first memory device.

2. The apparatus as recited in claim 1, wherein the second memory device is closer to a device that will access the data sooner than the first memory device.

3. The apparatus as recited in claim 1, wherein the event is associated with a threshold indicative of a number of occurrences of the event and the control circuitry is configured to cause the data to be moved responsive to meeting the threshold.

4. The apparatus as recited in claim 1, wherein responsive to the data being moved from the first memory device to the second memory device, the control circuitry is configured to update an address translation corresponding to the data.

5. The apparatus as recited in claim 1, wherein responsive to the stream of packets meeting criteria with multiple events identified by the programmable list of events, the control circuitry is configured to perform an action associated with an event of the multiple events with a higher priority than other events of the multiple events.

6. The apparatus as recited in claim 1, wherein the programmable list of events further comprises an entry that identifies an address translation completion event.

7. The apparatus as recited in claim 6, wherein responsive to detection of an address translation completion event, the control circuitry is configured to move targeted data to a non-volatile memory.

8. A method comprising:
    maintaining, in a memory, a programmable list of events comprising a plurality of entries, where each of the entries is configured to store:
        an identification of criteria that indicate an occurrence of an event; and
        a priority;
    monitoring, by a traffic analyzer, a stream of packets traversing a link, each of the packets comprising a memory access request; and
    responsive to the stream of packets meeting criteria associated with an event identified by an entry of the plurality of entries, programming a direct memory access (DMA) device to cause data corresponding to a data region targeted by a memory request of the stream of packets to be moved from a first memory device to a second memory device different from the first memory device.

9. The method as recited in claim 8, wherein the second memory device is closer to a device that will access the data sooner than the first memory device.

10. The method as recited in claim 8, wherein the event is associated with a threshold indicative of a number of occurrences of first event, and the method comprises causing the data to be moved responsive to the event meeting the threshold.

11. The method as recited in claim 8, wherein responsive to metadata of the packets meeting the criteria identified by the event, the method comprises updating an address translation corresponding to the data moved from the first second memory device to the first memory device.

12. The method as recited in claim 8, wherein the programmable list of events further comprises an entry that identifies a bias flip request event configured to cause invalidation of a cache line.

13. The method as recited in claim 8, wherein responsive to the stream of packets meeting criteria with multiple events identified by the programmable list of events, the method comprises performing an action associated with an event of the multiple events with a higher priority than other events of the multiple events.

14. The method as recited in claim 8, wherein the block of data is moved from the second memory device to the first memory device in further response to metadata of at least N packets from the one or more packets meeting the criteria identified by the event, where N is greater than one.

15. A system comprising:
    a first processor coupled a first memory device;
    a second processor coupled to a second memory device;
    a link connecting the first processor and the second processor; and
    a traffic analyzer comprising circuitry configured to:
        maintain, in a memory, a programmable list of events comprising a plurality of entries, where each of the entries is configured to store:
            an identification of criteria that indicate an occurrence of an event; and
            a priority;
        monitor a stream of packets generated by circuitry of the first processor traversing the link, wherein the stream of packets comprise memory access requests that target the second memory device; and responsive to the stream of packets meeting criteria associated with an event identified by an entry of the plurality of entries, program a direct memory access (DMA) device to cause data corresponding to a data region stored in the second memory device to be moved to the first memory device.

16. The system as recited in claim 15, wherein subsequent to the data being moved from the second memory device to the first memory device, the second processor comprises circuitry configured to move the data back to the second memory device by conveying a bias flip request via the link.

17. The system as recited in claim 15, wherein the event is associated with a threshold indicative of a number of occurrences of the event and the traffic analyzer is configured to cause the data to be moved responsive to event meeting the threshold.

18. The system as recited in claim 15, wherein responsive to the data being moved from the second memory device to the first memory device, the circuitry is configured to update an address translation associated with the data.

19. The system as recited in claim 15, wherein the circuitry is further configured to access a media device list that identifies media devices accessible by the circuitry.

20. The system as recited in claim 19, wherein the media device list is updated responsive to a discovery event.

* * * * *

UNITED STATES PATENT AND TRADEMARK OFFICE
CERTIFICATE OF CORRECTION

| | | |
|---|---|---|
| PATENT NO. | : 12,182,428 B2 | Page 1 of 1 |
| APPLICATION NO. | : 17/124872 | |
| DATED | : December 31, 2024 | |
| INVENTOR(S) | : Blagodurov et al. | |

It is certified that error appears in the above-identified patent and that said Letters Patent is hereby corrected as shown below:

In the Claims

Column 10, Claim 11, Line 37 & 38, please delete "the first second memory device" and insert -- the second memory device --

Column 10, Claim 14, Line 49 & 50, please delete "wherein the block of data" and insert -- wherein the data --

Signed and Sealed this
Twenty-ninth Day of April, 2025

Coke Morgan Stewart
*Acting Director of the United States Patent and Trademark Office*